United States Patent
Pang et al.

(10) Patent No.: US 9,594,753 B1
(45) Date of Patent: *Mar. 14, 2017

(54) FRAGMENTATION REPAIR OF SYNTHETIC BACKUPS

(71) Applicant: EMC Corporation, Hopkinton, MA (US)

(72) Inventors: Hung Hing Anthony Pang, San Jose, CA (US); Fabiano Botelho, Sunnyvale, CA (US); Dhanabal Ekambaram, Milpitas, CA (US); Nitin Garg, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 292 days.

This patent is subject to a terminal disclaimer.

(21) Appl. No.: 13/828,079

(22) Filed: Mar. 14, 2013

(51) Int. Cl.
*G06F 17/30* (2006.01)

(52) U.S. Cl.
CPC .............. *G06F 17/30008* (2013.01)

(58) Field of Classification Search
CPC ........... G06F 11/1435; G06F 11/1448; G06F 11/1453; G06F 17/30153; G06F 17/30156; G06F 12/02; G06F 2206/1004; G06F 3/0604
USPC .......... 707/692, 693, 999.205, 812, 999.101; 711/E12.002, 165
See application file for complete search history.

(56) References Cited

U.S. PATENT DOCUMENTS

| | | | | |
|---|---|---|---|---|
| 7,979,655 | B2* | 7/2011 | Edwards | G06F 12/0866 711/162 |
| 8,307,176 | B1* | 11/2012 | Wu et al. | 711/161 |
| 8,397,080 | B2* | 3/2013 | Lu | G06F 11/1458 707/692 |
| 8,447,740 | B1* | 5/2013 | Huang | G06F 17/30162 707/640 |
| 8,819,375 | B1* | 8/2014 | Pruett et al. | 711/165 |
| 8,904,137 | B1* | 12/2014 | Zhang | G06F 17/30135 711/165 |
| 8,914,330 | B2* | 12/2014 | Chron | G06F 17/30117 369/47.1 |
| 2006/0215626 | A1* | 9/2006 | Ross | H04B 7/2621 370/344 |
| 2009/0049260 | A1* | 2/2009 | Upadhyayula | G06F 3/0608 711/162 |
| 2009/0228660 | A1* | 9/2009 | Edwards | G06F 12/0866 711/133 |
| 2011/0271033 | A1* | 11/2011 | Williams | 711/102 |
| 2012/0030477 | A1* | 2/2012 | Lu | G06F 11/1453 713/189 |
| 2012/0131025 | A1* | 5/2012 | Cheung | G06F 17/30159 707/755 |
| 2013/0138613 | A1* | 5/2013 | Paulzagade et al. | 707/647 |
| 2013/0173842 | A1* | 7/2013 | Ng | G06F 12/0246 711/103 |

(Continued)

*Primary Examiner* — Dennis Truong
(74) *Attorney, Agent, or Firm* — Blakely, Sokoloff, Taylor & Zafman LLP

(57) ABSTRACT

Fragmentation repair of synthetic backups is disclosed. In various embodiments, a locality measure is computed with respect to a group of segments comprising a portion of a file. The computed locality measure is compared to a repair criteria. A decision whether to repair fragmentation of segments comprising the group is made based at least in part on the comparison.

24 Claims, 12 Drawing Sheets

(56) References Cited

U.S. PATENT DOCUMENTS

| | | | |
|---|---|---|---|
| 2013/0232125 A1* | 9/2013 | Huang | G06F 17/30162 707/692 |
| 2013/0282955 A1* | 10/2013 | Parker | G06F 12/0246 711/103 |
| 2013/0290275 A1* | 10/2013 | Stoakes et al. | 707/692 |
| 2013/0326186 A1* | 12/2013 | Shaikh et al. | 711/170 |
| 2014/0101113 A1* | 4/2014 | Zhang | G06F 11/1453 707/692 |
| 2014/0129779 A1* | 5/2014 | Frachtenberg | G06F 12/123 711/136 |
| 2015/0095596 A1* | 4/2015 | Yang | G06F 3/061 711/162 |
| 2015/0261779 A1* | 9/2015 | Huang | G06F 17/30156 707/692 |

* cited by examiner

FRAGMENTATION REPAIR OF SYNTHETIC BACKUPS

BACKGROUND OF THE INVENTION

A synthetic full backup is created by "stitching" together portions of a regular (or synthetic) full backup and one or more subsequent incremental backups. The metadata associated with such a backup can become highly fragmented, especially after multiple successive synthetics backups. For example, metadata of a synthetic backup may reference a portion of metadata of a prior backup, and a portion of the metadata of that prior backup may reference portions of metadata from even earlier backups, and so on, recursively, to some depth. The respective metadata for each referenced backup may reside in different locations on the storage media, requiring potentially many disparate containers or other logical storage units of data to be read ("loaded") to access the metadata for a synthetic backup.

In de-duplicated storage systems, read efficiency may be improved by intentionally writing duplicates to ensure that data or metadata that may need to be accessed at the same time are stored together, even if some of the data (e.g., data "segments") are known to be stored already, elsewhere on the system. However, typically there is a limit to how much duplicate data can be written. Also, de-duplication processing at the backup (or other de-duplicated) storage system may result in earlier-stored copies being deleted, potentially increasing the fragmentation of earlier backups.

BRIEF DESCRIPTION OF THE DRAWINGS

Various embodiments of the invention are disclosed in the following detailed description and the accompanying drawings.

DETAILED DESCRIPTION

Figure 1:
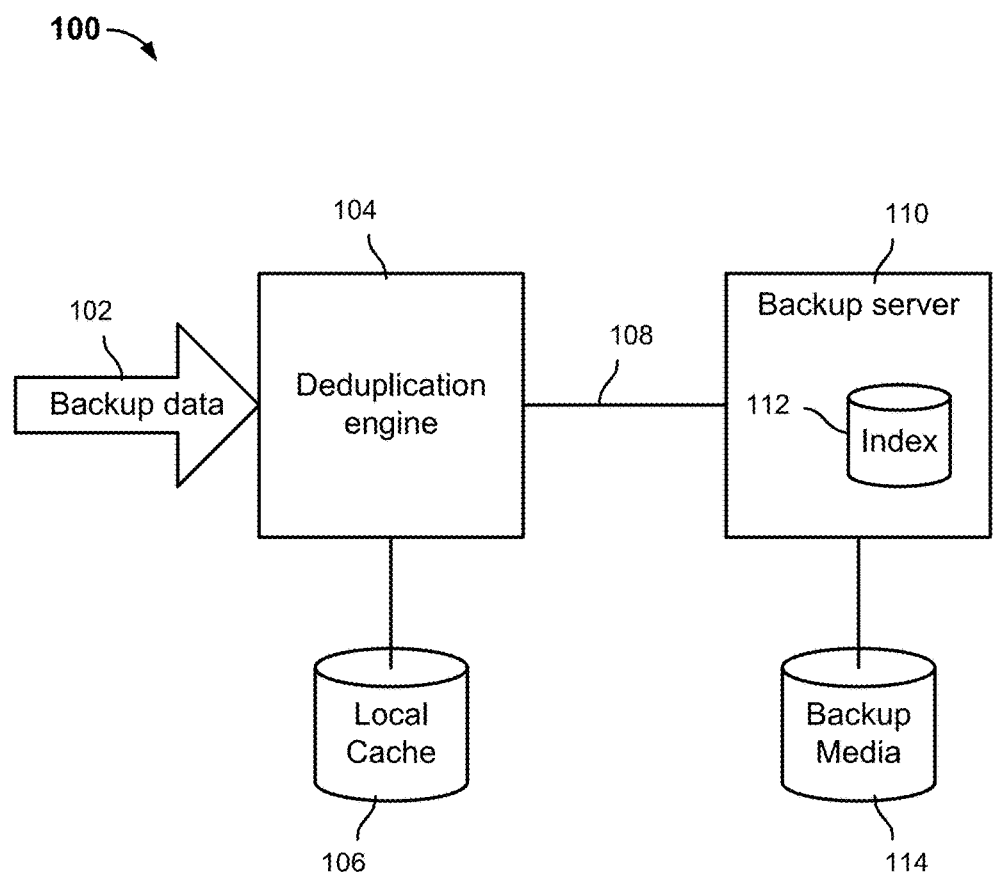
FIG. 1 is a block diagram illustrating an embodiment of a de-duplicated backup storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to repair fragmentation of synthetic backup data and/or metadata are disclosed. In some embodiments, fragmentation repair is performed on synthetic backup files and/or portions thereof, such as similarly sized "groups" of segments, based at least in part on a computed measure of segment "locality", for example, the loading locality (how many containers actually required to be loaded into a simulated or other cache in order to load segments of a group, as compared to an ideal or other reference) and/or unloading locality (how well-used to store group segments are containers that include group segments, as measured upon the containers being unloaded from the simulated cache). In some embodiments, fragmentation measurements and repairs are performed opportunistically, for example in connection with a file verification process performed in connection with a synthetic backup to ensure the files and data referenced by and/or otherwise included in the synthetic backup are valid. In some embodiments, a dynamic threshold may be used to determine whether to repair fragmentation of a group of segments. In some embodiments, a group that has been determined to have higher than a static threshold level of fragmentation may not be repaired if the group does not also meet a potentially higher dynamic threshold.

FIG. 1 is a block diagram illustrating an embodiment of a de-duplicated backup storage system. In the example shown, in the de-duplicated storage system 100 at stream of backup data 102 is processed by a de-duplication engine 104, which uses a local cache 106, in the first instance, to determine whether a segment or other unit of data included in stream 102 has already be sent, via a network and/or other connection 108, to a backup server 110. For example, the de-duplication engine 104 and/or an associated component may compute a fingerprint (e.g., a hash) for each segment or other unit of data received via stream 102. The local cache may be checked and if the fingerprint is found to be present that signifies that the corresponding data has already been sent to server 110 and a reference to the data, instead of the data itself, is sent to server 110. If the fingerprint is not found in local cache 106, in some embodiments de-duplication engine 104 asks the server 110 whether the server already has the data. The server 110 checks an index or other data store 112 and lets the de-duplication engine 106 know whether the data has already been stored. If so, the de-duplication engine sends only a reference; if not, the data itself is sent. If not, the data is sent via connection 108, and server 110 stores the data on backup media 114 and stores associated index data in index 112. If the data is sent by de-duplication engine 106, the de-duplication engine 106 adds the fingerprint to the local cache 106. If the local cache 106 becomes full or nearly full, an eviction policy may govern the removal of older (e.g., least recently added and/or used) data to make room for newer data (e.g., fingerprints of data chunks more recently sent and/or referenced).

Figure 2:
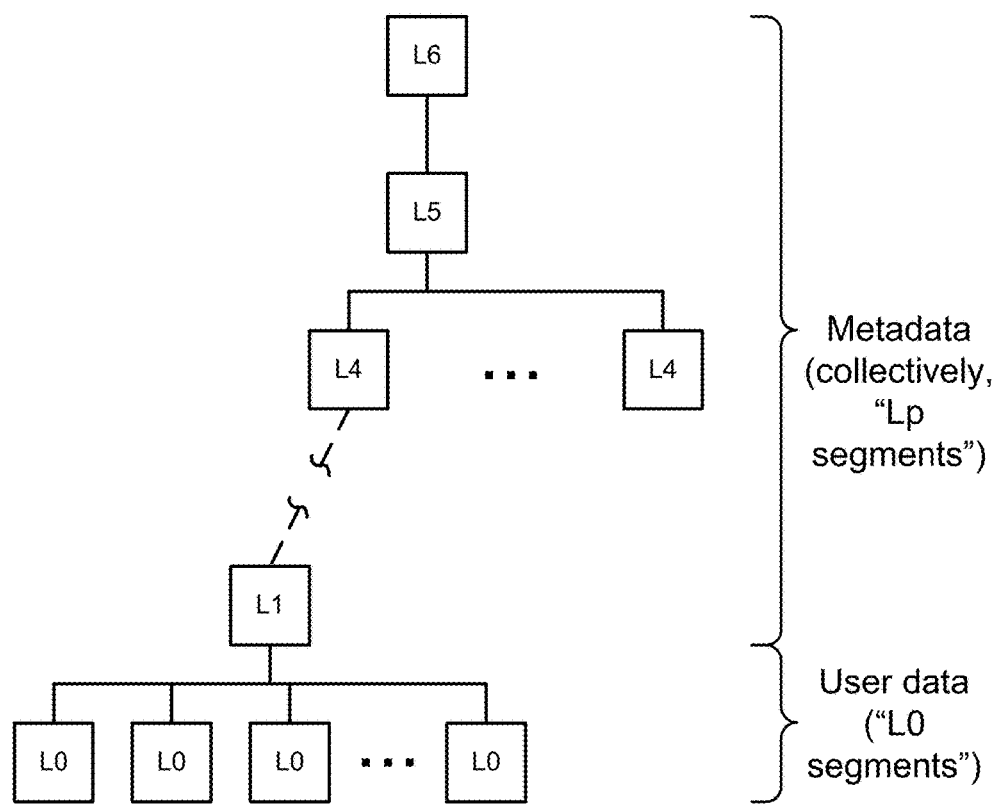
FIG. 2 is a block diagram illustrating an embodiment of a tree representation of data and metadata comprising a de-duplicated backup.

FIG. 2 is a block diagram illustrating an embodiment of a tree representation of data and metadata comprising a de-duplicated backup. In various embodiments, in a de-duplicated storage system a file may be represented as a tree of segments, such as the tree 200 of FIG. 2. The tree may have multiple levels depending on the logical file size. In the example shown in FIG. 2, the level zero (leaves) segments (or L0 segments) of the tree are segments with user data. Each L0 segment is identified by a content based fingerprint. Each level one segment (or L1 segment) have references to L0 segments and is also identified by a content based fingerprint. In general, segment at level k (Lk segments) have references to Lk-1 segments. All segments above L0 are the metadata of a file which are also referred to herein as "Lp segments". Segments can be shared among multiple files. In some embodiments, segments are packed into a compression region and multiple compression regions are packed into a container, which is a unit of storage. If consecutive segments of a section of a file are stored in a single container, then reading the section only requires loading a single container. If data is badly fragmented, these consecutive segments are spread across many containers and reading the same data requires loading many containers.

Repairing fragmentation in a de-duplicated storage system is challenging because redundant data is removed by the de-duplication process. This de-duplication process can be inline (i.e. before data is written to disk) or offline (i.e. after data is written to disk). A segment shared with multiple files can have different adjacent segments in different files. Therefore, storing consecutive segments together for one file can lead to fragmentation on other files. For backup application, the latest backup is most likely to be read and its fragmentation should be minimized at the cost of fragmenting the older backups. Techniques are known to repair data locality of the latest regular full backup inline by writing some consecutive data segments (redundant or new) from an incoming data stream into new containers. These methods typically cannot be applied to virtual synthetic backup because its incoming data stream does not contain all the data segments for repairing fragmentation.

Figure 3:
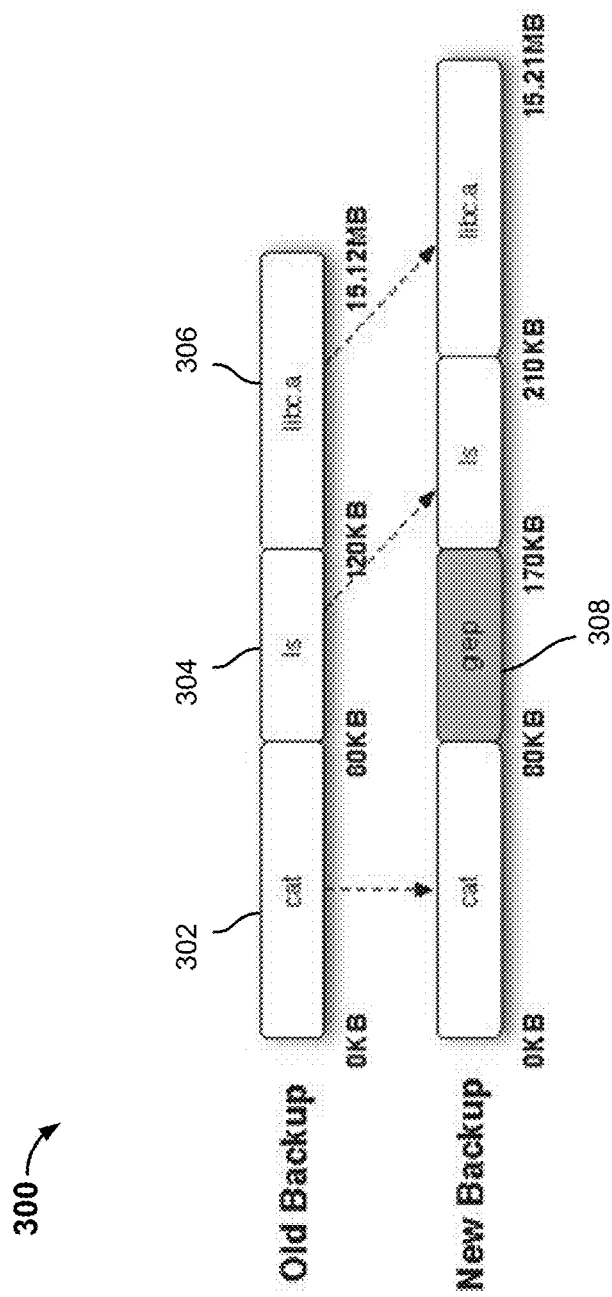
FIG. 3 is a block diagram illustrating an embodiment of a synthetic backup process.

FIG. 3 is a block diagram illustrating an embodiment of a synthetic backup process. In the example synthetic backup process 300, a "old" backup comprising segments 302, 304, and 306, in the order and having size and other attributes as shown, forms the basis for a "new", synthetic full backup. In the example shown, the "new" backup is synthesized at least in part by inserting a new segment 308 in a location between original segments 302 and 304 of the previous ("old") backup.

In synthetic backup, the incoming data stream contains mostly instructions to "stitch" portions of previous full backups and some new data to create the next full backup. A "stitch" instruction consists of the starting offset and the size of a region in a previous backup file and the starting offset of the next backup at which the region from the previous backup should be included. A simplistic approach to adapt known fragmentation repair techniques to virtual synthetic backup would be to read back L0 segments from storage and repair fragmentation while processing the "stitch" instructions. However, the performance of synthesizing a full backup would be penalized by those reads, especially if the L0 segments are badly fragmented.

The performance of synthesizing a full backup depends on how fast the "stitch" instructions are processed. The processing step traverses the segment tree of a previous backup according to the specified starting offsets, identify sub-trees that are covered by the regions and create a new backup file by referencing those sub-trees in its segment tree. Repeated synthetic backups will increase fragmentation of metadata because a segment tree may recursively reference sub-trees of various ages. Excessive fragmentation of metadata causes poor synthesizing performance. Prior fragmentation repair techniques did not consider metadata fragmentation and metadata is not presented in the incoming data stream.

Techniques to measure the degree of fragmentation of L0 and Lp segments in a file or a region of a file, to calculate a repair threshold dynamically, to select regions to repair with static and dynamic threshold and look-ahead information, to dynamically optimize the fragmentation of the latest synthetic backups in a de-duplicated storage system, and to perform fragmentation repair opportunistically, such as by integrating it with file verification, to amortize its cost, are disclosed. In various embodiments, one or more of the foregoing techniques, each described more fully below, may be used to identify and/or repair fragmentation of synthetic backup data (i.e., user data, such as level L0 segments) and/or metadata (e.g., L1 and above segments, sometimes referred to as "Lp segments").

Figure 4:
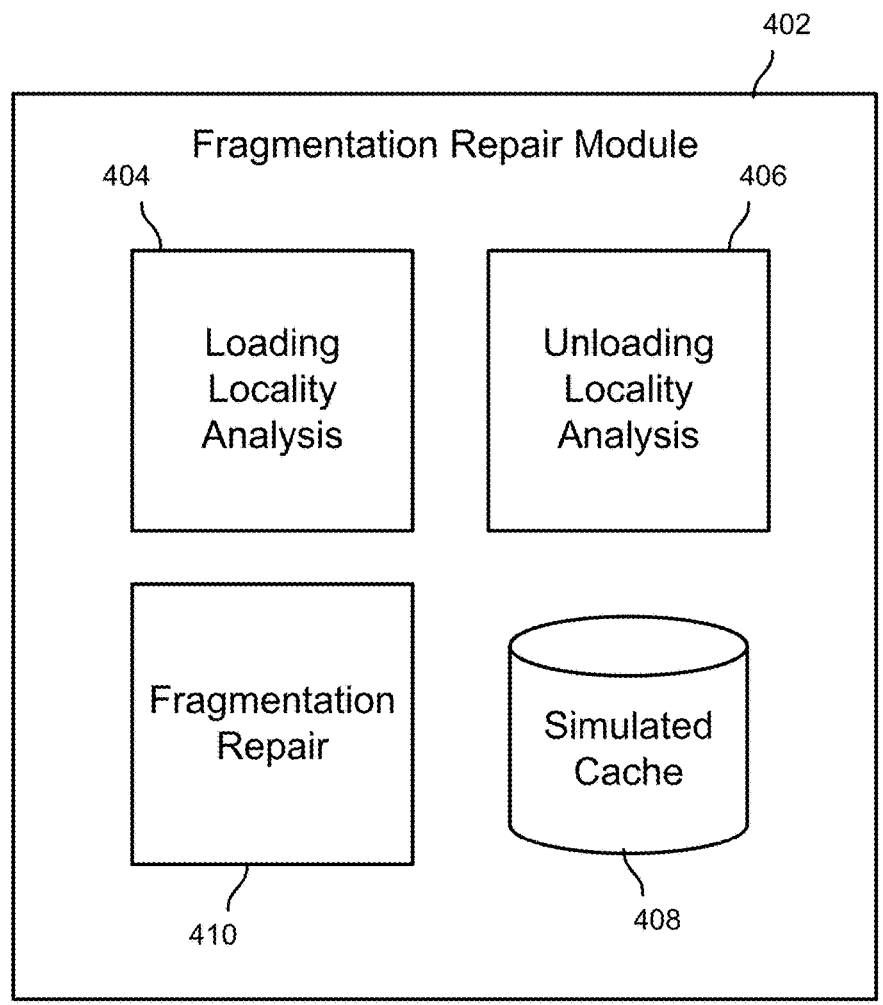
FIG. 4 is a block diagram illustrating an embodiment of a fragmentation repair module within a de-duplicated storage system.

FIG. 4 is a block diagram illustrating an embodiment of a fragmentation repair module within a de-duplicated storage system. In the example shown, the fragmentation repair module 402 includes a loading locality analysis component 404 configured to compute a locality metric that reflects a degree of fragmentation of synthetic backup data (L0 segments) and/or metadata (Lp segments) as stored in the de-duplicated storage system. In the example shown, the "loading locality" may be computed in connection with the actual or virtual loading into simulated cache 408 of segments comprising a file or portion thereof (e.g., equally sized groups of segments comprising a file). For example, a number of logical containers actually required to be loaded to load the segments of a "group" may be compared to an ideal number of containers that could in theory be sufficient to store the segments. In the example shown, an unloading locality analysis component 406 may be configured to compute, for example as containers are evicted from simulated cache 408 to make room for other data and/or metadata, an unloading locality metric, for example one that provides a measure of how fully containers used to store segments of a group are used to store such segments (as opposed to segments from other groups, for example). In various embodiments, as groups (or files or other-denominated portions thereof) are identified as meeting criteria to be repaired, a fragmentation repair component 410 performs the repair, for example by reading the segments comprising a group from their current location(s) (containers) and "packing" them (storing a copy of each) in new containers to decrease fragmentation.

In various embodiments, a synthetic backup file targeted for fragmentation repair comprises 2 data streams: a Lp data stream (metadata) and a L0 data stream (user data). Each data stream consists of a sequence of segments of that type when reading the file sequentially from the beginning to the end. In various embodiments, the sequence is partitioned into similar size groups of consecutive segments. The fragmentation level is measured on each group and a repair decision is made for each group, which makes a group to be a minimum unit for repair. A group is formed in various embodiments by buffering fingerprints for Lx segments (where x=0 or p) of at least some pre-defined size and stop as soon as the next segments requires a new container to be loaded.

In various embodiments, the fragmentation of L0 and Lp streams are measured and repaired independently. The fragmentation level of a particular type is measured in some embodiments in terms of loading locality by comparing the number of containers loaded with the ideal number of containers that should be loaded when reading the file sequentially. Expressed as a formula:

$$\text{Locality}_{L,k,x} = \left| \frac{\text{\# of containers actually loaded for } L_x \text{ segments in segment group } k}{\text{\# of containers ideally loaded for } L_x \text{ segments in segment group } k} \right|$$

where x=0 (L0 segment stream) or p (Lp stream).

The ideal number of containers loaded for Lx segments of segment group k can be estimated from the logical size of segment group k, its local compression ratio in use and capacity of a container. For example:

$$\begin{array}{l}\text{\# of containers ideally}\\ \text{loaded for } L_x \text{ segments}\\ \text{in segment group } k\end{array} = \left[ \frac{\text{Size of } L_x \text{segments in group } k}{\text{Local compression ratio for } L_x \text{ segment}} * \text{Container size} \right]$$

In various embodiments, the number of containers actually loaded is measured by counting the number of containers loaded or reloaded in a simulated cache when processing the Lx data stream in order and each data stream has its own cache. The simulated caches implement LRU (least recently used) policy. In various embodiments, the measured locality is compared to a detection threshold, e.g., a static threshold, to determine whether fragmentation repair should be performed with respect to the group.

In various embodiments, the repair decision of a segment group may be based not only on the loading locality of the group, but may also depend on the loading locality of the next group because a container loaded by the group may be barely used in the group but heavily used in the next group. For brevity, the segment group that is under repair decision is called current group and the group after that is called look-ahead group.

Figure 5:
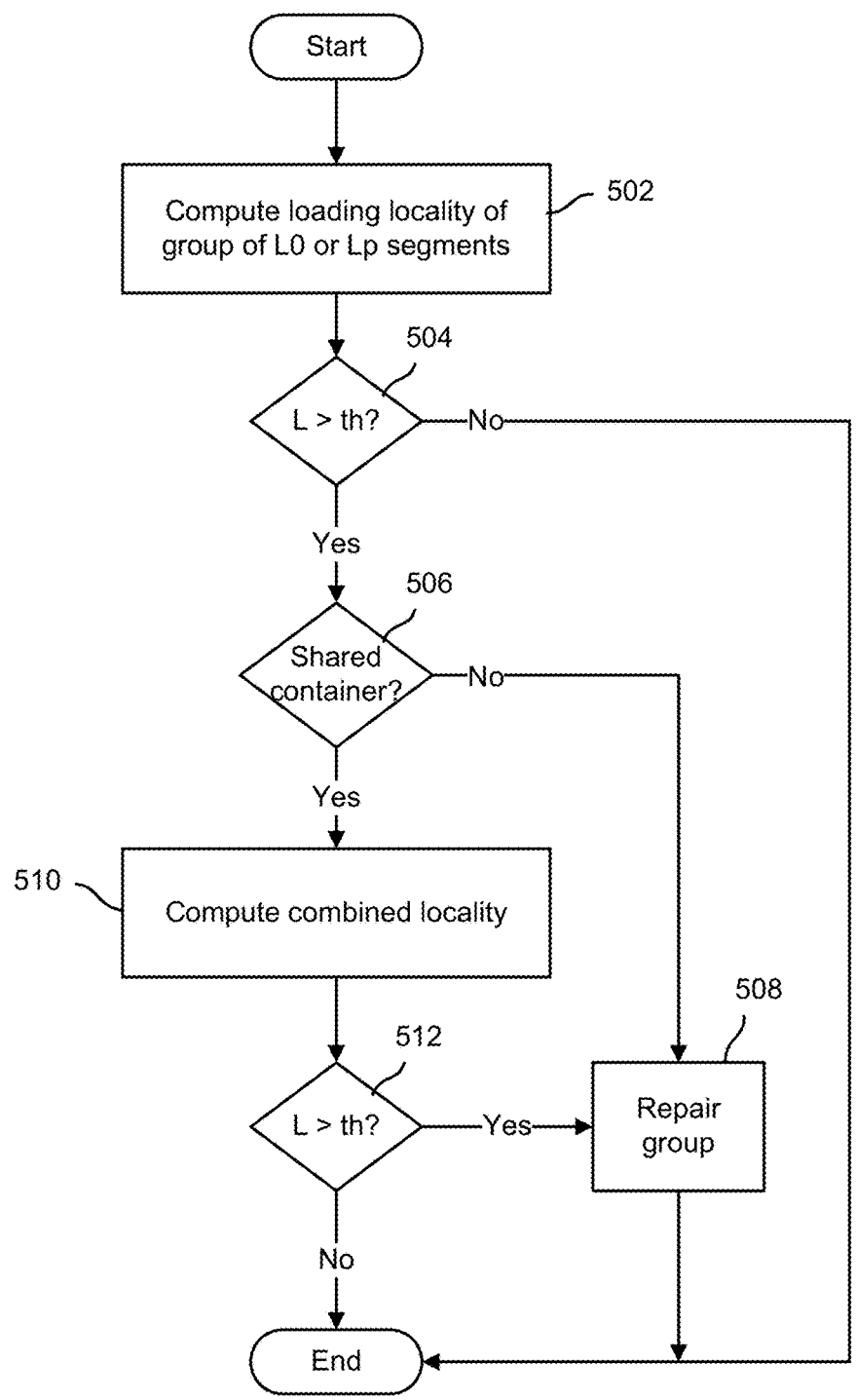
FIG. 5 is a flow chart illustrating an embodiment of a process to measure and repair fragmentation.

FIG. 5 is a flow chart illustrating an embodiment of a process to measure and repair fragmentation. In the example shown, the loading locality of a group of L0 or Lp segments is computed, e.g., using the equations above (502). If the computed loading locality is less than a prescribed repair threshold (504), no repair is performed. If the computed loading locality exceeds the prescribed repair threshold (504), in the example shown in FIG. 5 a repair is not necessarily performed. Instead, a determination is made as to whether the current group shares one or more containers with a next or "look-ahead" group (506). If segments of both the current group and the look-ahead group are stored in a shared container (506), a combined locality of the current group together with the look-ahead group is computed (510). If the combined locality exceeds the repair threshold (512), or if the current group exceeds the repair threshold and does not share any container with the look ahead group (504, 506), then fragmentation repair processing is performed on the current group. If the current group shares one or more containers with the look-ahead group but the locality of the combined groups does not exceed the repair threshold (506, 510, 512), no repair is performed.

Figure 6:
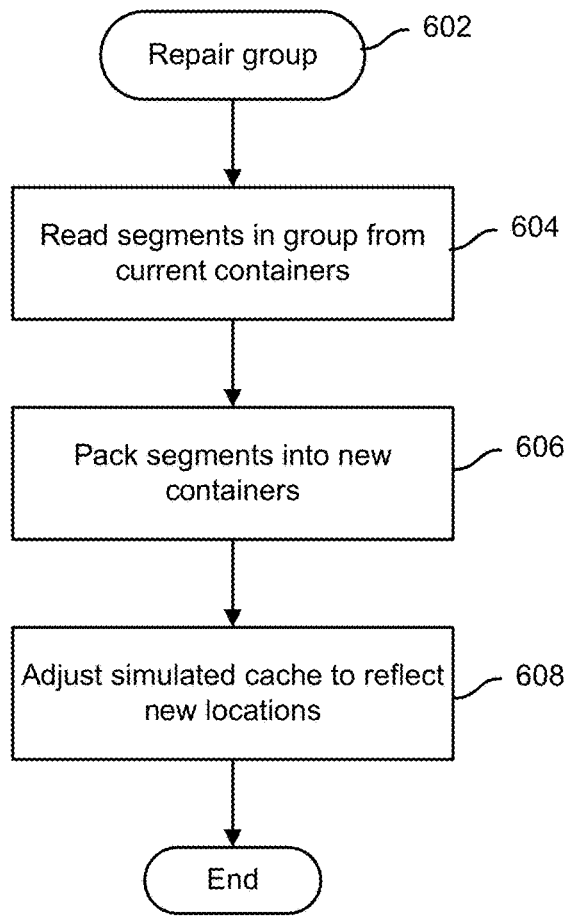
FIG. 6 is a flow chart illustrating an embodiment of a fragmentation repair process.

FIG. 6 is a flow chart illustrating an embodiment of a fragmentation repair process. In various embodiments, the process of FIG. 6 is used to implement step 508 of FIG. 5. In the example shown, the repair process (602) reads the segments in the group from the old containers (604) and packs them into new containers (606). The loading locality of the group will now become lower because reading its segments will load the new containers which are fewer in number than the old containers. The simulated cache is adjusted to replace the old containers loaded by the current group with the new containers (608) so that loading locality of future groups referencing segments in old/new containers can be correctly measured.

In various embodiments, once the simulated cache is fully populated, each container loaded in the group will cause a container in the cache to be unloaded. The unloaded containers in the group were loaded from the current group or previous groups. The fragmentation of the unloaded containers is measured in various embodiments in terms of unloading locality by comparing the total physical size available in the unloaded containers to the actual total physical size of the referenced segments in the unloaded containers.

In various embodiments, one or both of loading locality and unloading locality may be used to measure and selective perform fragmentation repair. For example, loading locality may be used alone, without also measuring unloading locality; or, unloading locality may be used alone, without also measuring loading locality; or, both may be used together.

Figure 7:
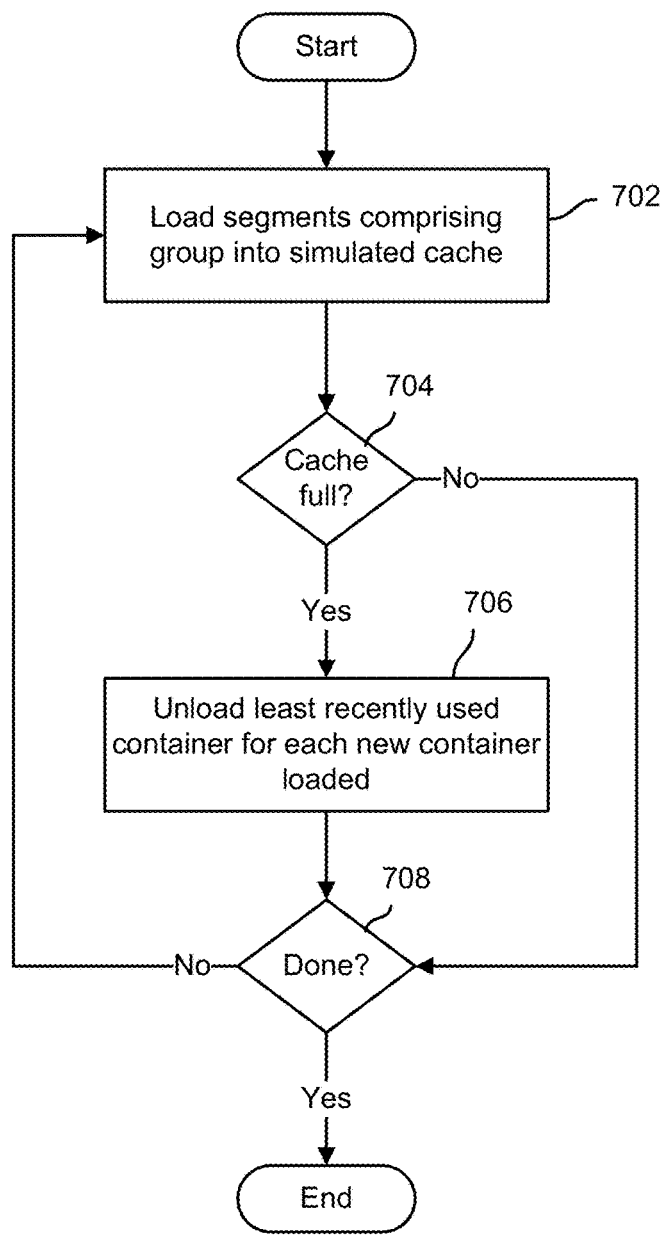
FIG. 7 is a flow chart illustrating an embodiment of a process to maintain a simulated cache.

FIG. 7 is a flow chart illustrating an embodiment of a process to maintain a simulated cache. In the example shown, segments comprising a current group are loaded into the simulated cache (702). If the cache is full (704), then a least recently used container is unloaded from the simulated cache to make room for the new containers to be loaded (706). The process of unloading least recently used containers to make room for newly loaded containers continues until done (708), e.g., the fragmentation repair processing ends.

Figure 8:
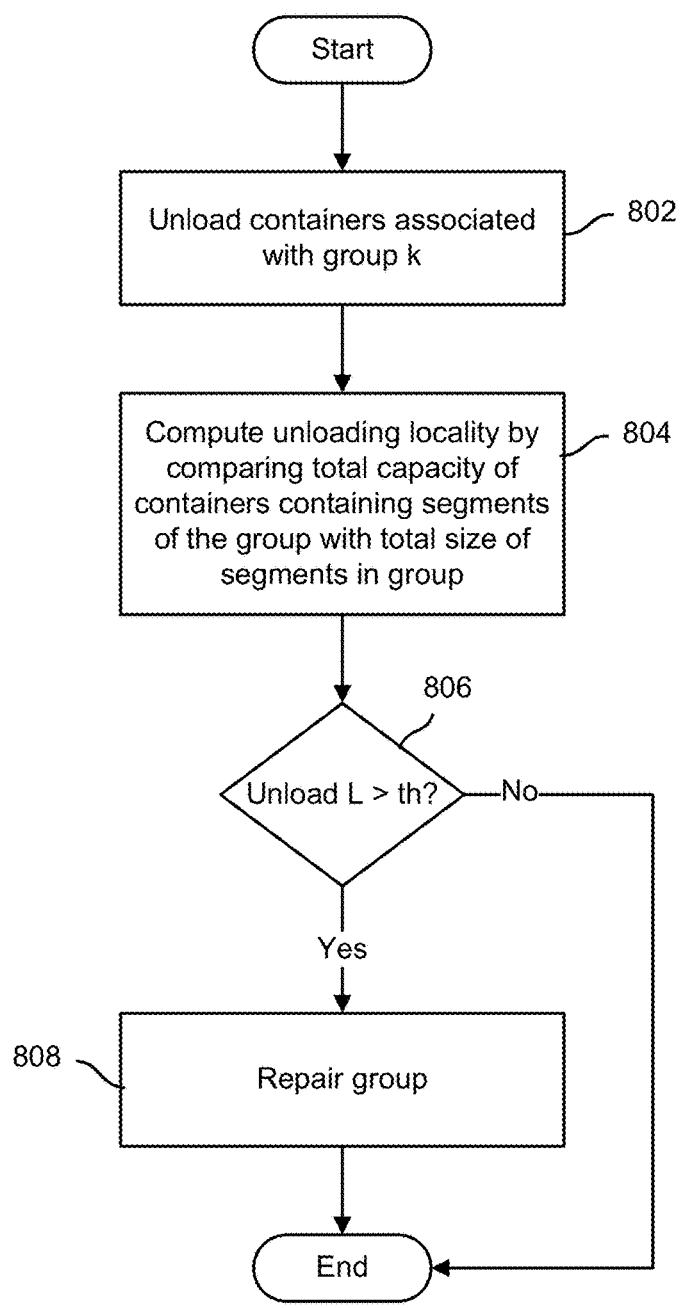
FIG. 8 is a flow chart illustrating an embodiment of a process to repair fragmentation with respect to containers unloaded from a simulated cache.

FIG. 8 is a flow chart illustrating an embodiment of a process to repair fragmentation with respect to containers unloaded from a simulated cache. In the example shown, containers associated with a previously-loaded group k are unloaded from the simulated cache (802), for example to make room for a current group's containers to be loaded. An unloading locality measure is computed (804), in this example by comparing the total capacity of containers associated with the group to the total size of group data stored in the containers. If the unloading locality exceeds a repair threshold (806), fragmentation repair is performed with respect to the group (808). If the unloading locality does not exceed the repair threshold (806), no repair is performed.

In various embodiments, the unloading locality is computed as follows:

$$\text{Locality}_{U,k,x} = \left[ \frac{\text{\# of containers unloaded with } L_x \text{ segments} \times \text{Storage size of a container}}{\text{Total physical size of } L_x \text{ segments referenced in unloaded containers in segment group } k} \right] \text{ where}$$

$$x = 0 \text{ or } p.$$

In various embodiments, if the unloaded containers in a group are selected for repair because of unloading locality, then the repair process will identify containers which are underutilized, read segments referenced in them since their most recent loads in the cache and pack the segments into new containers.

Fragmentation repair as performed in various embodiments, e.g., the example in FIG. 6, results in duplicate copies of segments comprising a group being packed into new containers. If a limit must be enforced on amount of duplicates can be generated for a file, groups should be chosen wisely for repair. Ideally the worst locality (most fragmented) groups over the whole file should be chosen because repairing them is more effective to improve the overall file fragmentation. A static threshold cannot address this problem because it will always select the first set of groups with locality beyond the static threshold. Use of a dynamic threshold mechanism to selectively repair groups that have poor locality is disclosed. In various embodiments, the dynamic threshold is set to be the greater of a static threshold or the running average locality from the beginning of the file up to the current group.

In various embodiments, the running average loading locality is defined as:

$$A_{L,k,x} = \left[ \frac{\text{\# of containers actually loaded for } L_x \text{ segments since the beginning of the file to group } k}{\text{\# of containers ideally loaded for } L_x \text{ segments since the beginning of the file to group } k} \right]$$

In various embodiments, the running average unloading locality is defined as:

$$A_{U,k,x} = \left[ \frac{\text{\# of containers unloaded with } L_x \text{ segments} \times \text{Storage size of a container}}{\text{Total physical size of } L_x \text{ segments referenced in unloaded containers since the beginning of the file to group } k} \right]$$

Figure 9:
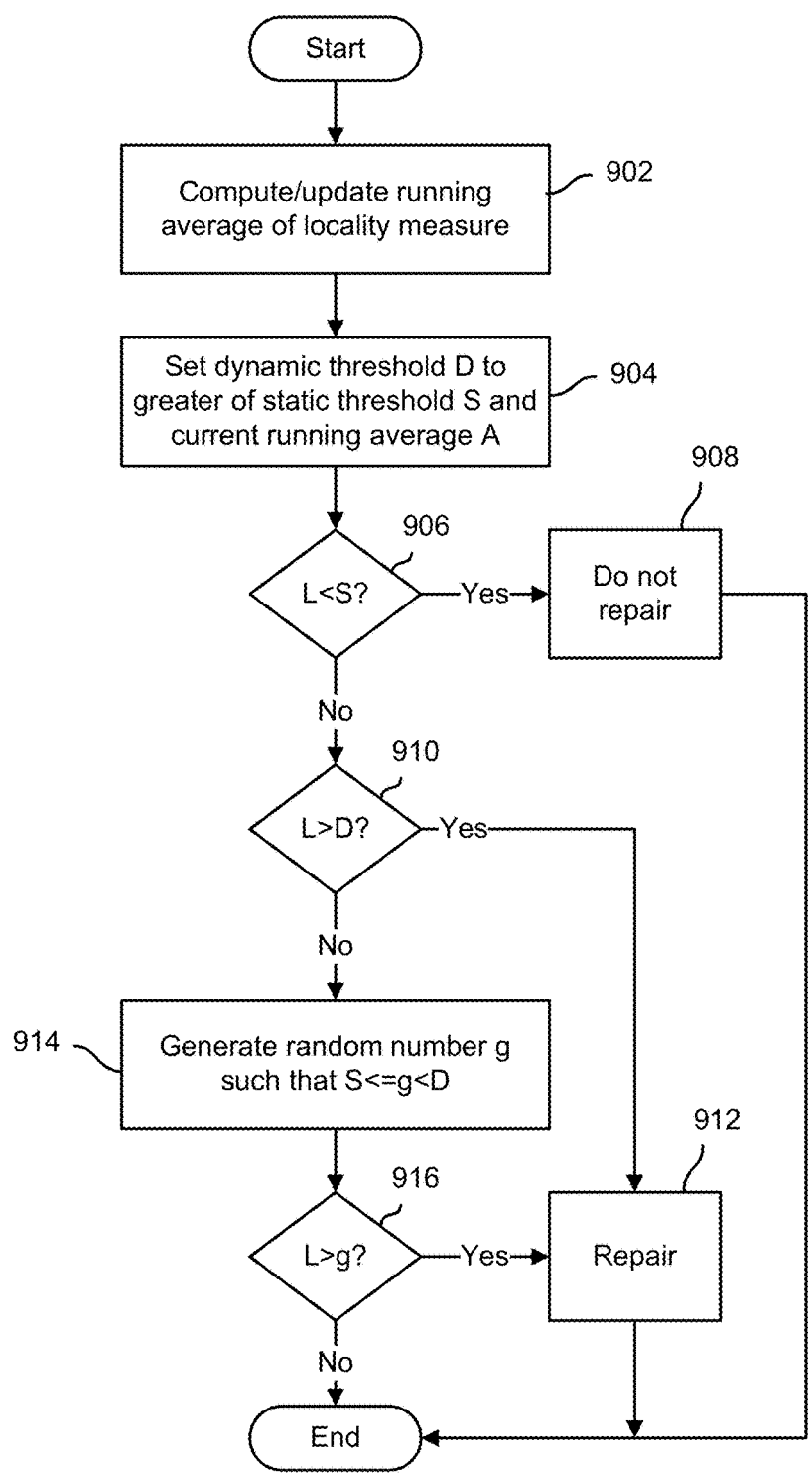
FIG. 9 is a flow chart illustrating an embodiment of a fragmentation repair process that uses a dynamic repair threshold.

FIG. 9 is a flow chart illustrating an embodiment of a fragmentation repair process that uses a dynamic repair threshold. In the example shown, a running average loading and/or unloading locality is computed and/or updated (902). A dynamic repair threshold is set to be equal to the greater of the running average locality A and a static repair threshold S (904). If the locality of the current group is less than the static threshold (906), the current group is not repaired (908). If the locality of the current group is greater than or equal to the static threshold (906) and is also greater than or equal to the dynamic threshold computed/updated at step 902 (910), then the current group is repaired (912). If the locality of the current group is greater than or equal to the static threshold (906) but less than the dynamic threshold (910), then a random number "g" in the range between the static threshold and the dynamic threshold is generated (914). If the current group's locality is greater than or equal to the random number "g" (916), the current group is repaired (912). If not (916), the current group is not repaired, even though the locality of the current group is greater than or equal to the static threshold.

In some embodiments, an alternative approach to selectively repairing fragmentation in a manner that tends to be biased towards repair the most badly fragmented regions is to record a distribution of locality of regions that have been seen so far and use it as a reference to decide whether the current region should be repaired. However, in some contexts the locality distribution of earlier regions in a file may not reflect the locality distribution of later regions in a file and therefore the alternative approach described in this paragraph may consistently give up repair opportunities.

File verification is an important step after synthesizing a backup because the synthesis assumes that the base files are in good condition; but this may not be true in the presence of faulty hardware or software. A storage system periodically scrubs the stored containers to identify the corrupted ones and marks them as invalid. The "stitch" instruction may reference to a sub-tree with segments stored in a corrupted container. Therefore, the integrity of a synthetic backup must be verified by traversing the segment tree of the file and ensuring that all containers the segments reside in are still valid.

In various embodiments, fragmentation repair as disclosed herein is performed during file verification. While traversing the segment tree to perform file verification, segment groups are formed and corresponding L0 and Lp localities (as applicable) are measured. The locality measurements require reading Lp data and index lookups on L0 fingerprints. Since these operations are also required by verification, the locality measurement does not impose extra index lookups in the file verification. The L0 segments comprising a group must be read in some embodiments only if an L0 segment group is selected for repair. If an Lp segment group is selected for repair, the Lp segments may be read again for repair.

Figure 10:
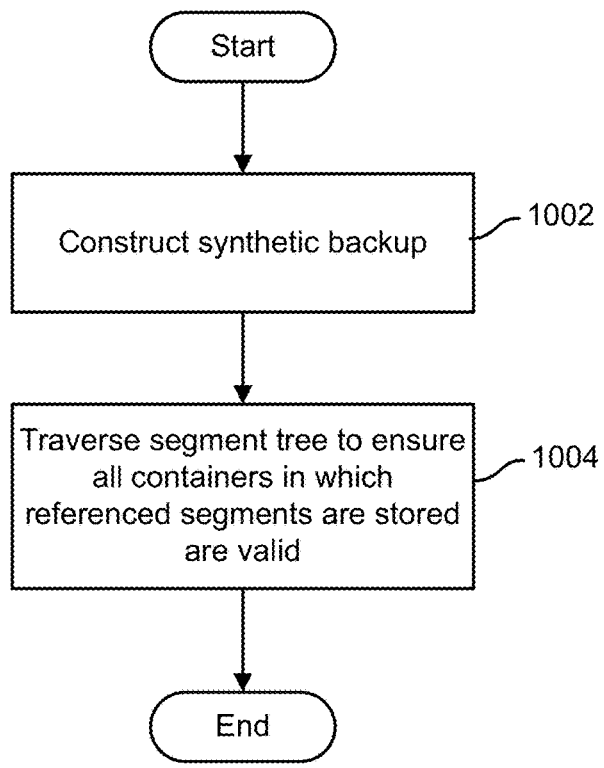
FIG. 10 is a flow chart illustrating an embodiment of a process to perform and verify a synthetic backup.

FIG. 10 is a flow chart illustrating an embodiment of a process to perform and verify a synthetic backup. In the example shown, a synthetic backup is constructed (1002). The segment tree of the resulting backup file is traversed to ensure that all containers in which one or more segments referenced in the segment tree are stored are valid (1004).

Figure 11:
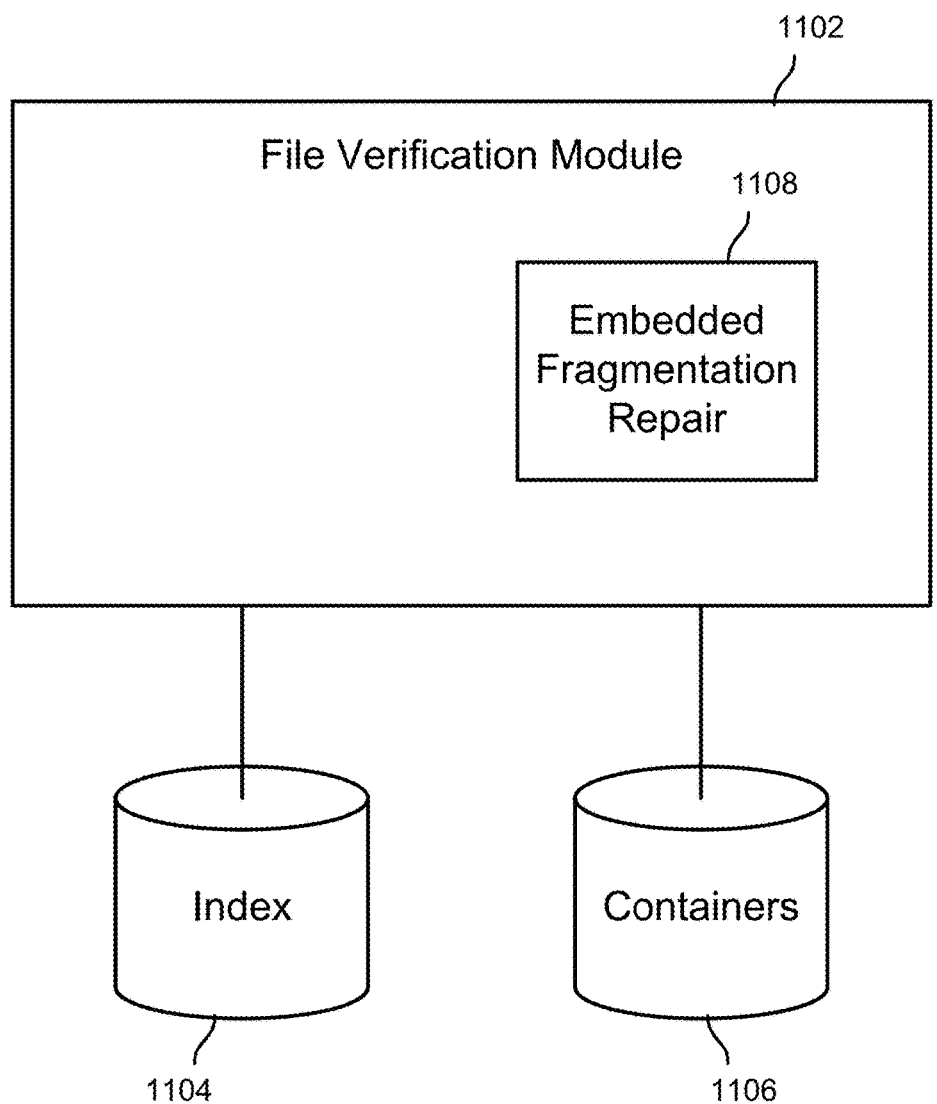
FIG. 11 is a block diagram illustrating an embodiment of a file verification module.

FIG. 11 is a block diagram illustrating an embodiment of a file verification module. In the example shown, file verification module 1102 uses index data 1104 and container data 1106 to perform file verification with respect to a synthetic backup, e.g., as in step 1004 of FIG. 10. A fragmentation repair process and/or component 1108 is embedded in the file verification module 1102, and piggybacks on index and container data read operations performed in connection with file verification to compute localities and make fragmentation repair decisions based thereon, as disclosed herein.

In various embodiments, if an older backup is being verified and repaired while a newer version is synthesized with the former one as a base, the repair on the old version is aborted but its verification continues. The effort of repair is shifted to the new synthetic backup. Since the new synthetic backup should resemble the base file on which it is based, repair on the new file in various embodiments continues from the point at which repair of the base file was stopped. The fragmentation of the newest synthetic backups will be improved over time. For example, even if only a portion of each synthetic backup file is repaired before repair (but not file verification) is stopped with respect to that file, e.g., to focus instead on a newer backup that uses the former one as a base, as subsequent and successive backups are repaired beginning from a point corresponding to where repair was stopped in a base backup, over time for a given synthetic backup more and more of the underlying metadata and data will have been repaired in the course of fragmentation repair of that backup or previous of one on which it is based.

Figure 12:
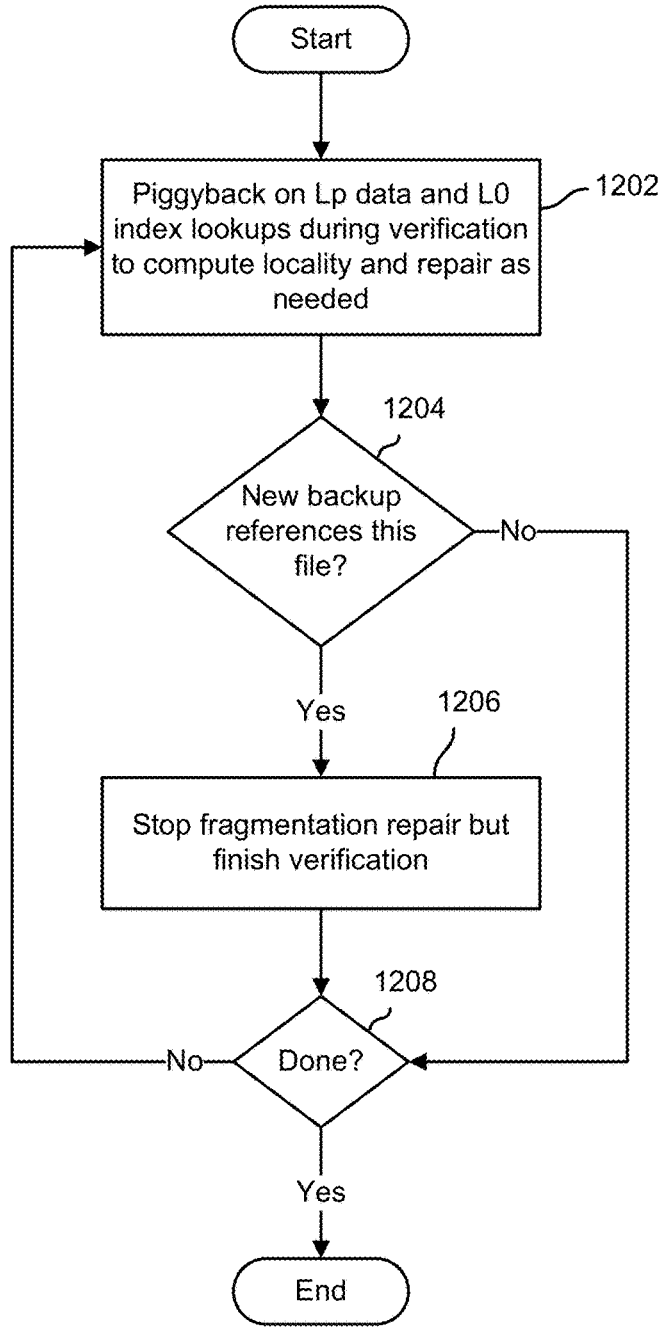
FIG. 12 is a flow chart illustrating an embodiment of a process to repair fragmentation in connection with file verification.

FIG. 12 is a flow chart illustrating an embodiment of a process to repair fragmentation in connection with file verification. In the example shown, Lp data and L0 index lookups performed during file verification are used in addition to compute corresponding locality measures and repair fragmentation based at least in part thereon, as described herein (1202). If it is detected that a new backup references the file current being verified and repaired as a base file (1204), the fragmentation repair is stopped with respect to the file but the file verification continues through completion (1206), i.e., either until the file is verified to reference only segments in valid containers or verification fails. File verification and opportunistic fragmentation repair continue until done (1208), e.g., both file verification and fragmentation repair are completed and/or stopped with respect to the file.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
computing, by one or more processors, a locality measure with respect to a first group of segments comprising a portion of a file stored on a storage device, wherein the locality measure is based at least in part on a number of containers associated with the first group of segments;
comparing, by the one or more processors, the computed locality measure to a repair criteria, wherein the repair criteria comprises a static threshold and a dynamic criteria, the dynamic criteria being determined based at least in part on a locality value with respect to one or more second groups of segments that share one or more of the number of containers associated with the first group of segments, wherein the locality value is based at least in part on a number of containers associated with the one or more second groups of segments;
determining, by the one or more processors, based at least in part on the comparing of the computed locality measure to the repair criteria whether to repair fragmentation of segments comprising the first group of segments; and
repairing fragmentation of the first group of segments based at least in part on determining that the computed locality measure satisfies the repair criteria.

2. The method of claim 1, wherein the locality measure comprises a loading locality measure computed based on information associated with loading into a cache containers in which segments comprising the first group of segments are stored.

3. The method of claim 2, wherein the number of containers associated with the first group of segments corresponds to an actual number of containers required to be loaded to load the first group of segments, and the loading locality measure is computed at least in part by comparing the actual number of containers required to be loaded to load the first group of segments to a calculated ideal number of containers that should be sufficient to store segments comprising the first group of segments.

4. The method of claim 3, wherein the ideal number of containers is computed based at least in part on a size of at least one segment in the first group of segments, a compression ratio of the segments included in the first group of segments, and a size of at least one of the containers associated with the first group of segments.

5. The method of claim 1, wherein the number of containers associated with the first group of segments corresponds to a number of containers unloaded in connection with populating a simulated cache, and the locality measure comprises an unloading locality measure computed based on information associated with unloading, from a cache, containers in which segments comprising the first group of segments are stored.

6. The method of claim 5, wherein the unloading locality measure is computed at least in part by comparing a total capacity of containers that include segments comprising the first group of segments to the total size of the segments comprising the first group of segments.

7. The method of claim 1, wherein the first group of segments comprises a current group and wherein the determining of whether to repair fragmentation of segments comprising the first group of segments includes, in the event the computed locality measure is determined to satisfy the static threshold of the repair criteria, computing a combined locality measure for a combined data set comprising the current group and a look-ahead group comprising an adjacent next set of segments comprising the file.

8. The method of claim 7, wherein the determining of whether to repair fragmentation of segments comprising the first group of segments further includes performing the repair based at least in part on a determination that the combined locality measure also satisfies the static threshold of the repair criteria.

9. The method of claim 7, wherein the determining of whether to repair fragmentation of segments comprising the first group of segments further includes determining to not perform the repair based at least in part on a determination that the combined locality measure does not satisfy the static threshold of the repair criteria.

10. The method of claim 1, further comprising repairing fragmentation of the group in the event the determination is made to repair the first group of segments.

11. The method of claim 10, wherein repairing fragmentation of the group comprises reading segments comprising the first group of segments from one or more current containers and packing the segments in one or more new containers.

12. The method of claim 1, wherein the steps of computing, comparing, and determining are performed separately with respect to user data segments on the one hand and metadata segments on the other.

13. The method of claim 1, wherein the computing the first locality measure, the comparing of the computed locality measure to the repair criteria, and the determining whether to repair the fragmentation of segments comprising the first group of segments are performed in connection with a file verification of the file.

14. The method of claim 1, wherein the repair criteria is computed dynamically in relation to the computing of the locality measure and the comparing of the computed locality measure to the repair criteria.

15. The method of claim 1, wherein the locality measure indicates a degree of fragmentation of segments associated with synthetic backup data and segments associated with corresponding metadata.

16. The method of claim 1, wherein the locality value corresponds to a running average locality measure.

17. A system, comprising:
a processor configured to:
compute a locality measure with respect to a first group of segments comprising a portion of a file stored on a storage device, wherein the locality measure is based at least in part on a number of containers associated with the first group of segments;
compare the computed locality measure to a repair criteria, wherein the repair criteria comprises a static threshold and a dynamic criteria, the dynamic criteria being determined based at least in part on a locality value with respect to one or more second groups of segments that share one or more of the number of containers associated with the first group of segments, wherein the locality value is based at least in part on a number of containers associated with the one or more second groups of segments;
determining, based at least in part on the comparing of the computed locality measure to the repair criteria, whether to repair fragmentation of segments comprising the first group of segments; and
repairing fragmentation of the first group of segments based at least in part determining that the computed locality measure satisfies the repair criteria; and
a memory coupled to the processor and configured to store the computed first locality measure.

18. The system of claim 17, wherein the locality measure comprises a loading locality measure computed based on information associated with loading into a cache containers in which segments comprising the first group of segments are stored.

19. The system of claim 18, wherein the number of containers associated with the first group of segments corresponds to an actual number of containers required to be loaded to load the first group of segments, and the loading locality measure is computed at least in part by comparing an actual number of containers required to be loaded to load the first group of segments to a calculated ideal number of containers that should be sufficient to store segments comprising the first group of segments.

20. The system of claim 17, wherein the number of containers associated with the first group of segments corresponds to a number of containers unloaded in connection with populating a simulated cache, and the first locality measure comprises an unloading locality measure computed based on information associated with unloading, from a cache, containers in which segments comprising the first group of segments are stored.

21. The system of claim 17, wherein the first group of segments comprises a current group and wherein the determining of whether to repair fragmentation of segments comprising the first group of segments includes, in the event the computed locality measure is determined to satisfy the static threshold of the repair criteria, computing a combined locality measure for a combined data set comprising the current group and a look-ahead group comprising an adjacent next set of segments comprising the file.

22. The system of claim 21, wherein the determining of whether to repair fragmentation of segments comprising the first group of segments further includes performing the repair based at least in part on a determination that the combined locality measure also satisfies the static threshold of the repair criteria.

23. The system of claim 21, wherein the determining of whether to repair fragmentation of segments comprising the first group of segments further includes determining to not perform the repair based at least in part on a determination that the combined locality measure does not satisfy the static threshold of the repair criteria.

24. A computer program product embodied in a tangible, non-transitory computer readable storage medium and comprising computer instructions for:
computing a locality measure with respect to a first group of segments comprising a portion of a file stored on a storage device, wherein the locality measure is based at least in part on a number of containers associated with the first group of segments;
comparing the computed locality measure to a repair criteria, wherein the repair criteria comprises a static threshold and a dynamic criteria, the dynamic criteria being determined based at least in part on a locality value with respect to one or more second groups of segments that share one or more of the number of containers associated with the first group of segments, wherein the locality value is based at least in part on a number of containers associated with the one or more second groups of segments;
determining, based at least in part on the comparing of the computed locality measure to the repair criteria, whether to repair fragmentation of segments comprising the first group of segments; and
repairing fragmentation of the first group of segments based at least in part determining that the computed locality measure satisfies the repair criteria.

* * * * *